(12) United States Patent
Jenkins et al.

(10) Patent No.: US 8,751,607 B2
(45) Date of Patent: Jun. 10, 2014

(54) DIGITAL CONTENT DOWNLOAD INSURANCE

(75) Inventors: David L. J. Jenkins, Portland, OR (US); Daniel Lamet, Tigard, OR (US)

(73) Assignee: Judedavid LLC, Portland, OR (US)

( * ) Notice: Subject to any disclaimer, the term of this patent is extended or adjusted under 35 U.S.C. 154(b) by 576 days.

(21) Appl. No.: 12/193,656

(22) Filed: Aug. 18, 2008

(65) Prior Publication Data

US 2009/0049115 A1 Feb. 19, 2009

Related U.S. Application Data

(60) Provisional application No. 60/956,530, filed on Aug. 17, 2007.

(51) Int. Cl.
*G06F 15/16* (2006.01)

(52) U.S. Cl.
USPC .......................................... 709/219

(58) Field of Classification Search
USPC ............................ 705/4; 709/219
See application file for complete search history.

(56) References Cited

U.S. PATENT DOCUMENTS

| | | | |
|---|---|---|---|
| 6,173,376 B1 | 1/2001 | Fowler et al. | |
| 6,385,596 B1 * | 5/2002 | Wiser et al. | 705/51 |
| 6,460,076 B1 * | 10/2002 | Srinivasan | 709/219 |
| 6,487,558 B1 * | 11/2002 | Hitchcock | 1/1 |
| 6,728,711 B2 | 4/2004 | Richard | |
| 6,904,264 B1 * | 6/2005 | Frantz | 455/3.04 |
| 7,430,542 B2 * | 9/2008 | DeMello et al. | 705/54 |
| 7,461,221 B2 | 12/2008 | Palapudi | |
| 7,555,648 B2 * | 6/2009 | Riku et al. | 713/171 |
| 7,627,872 B2 * | 12/2009 | Hebeler et al. | 719/315 |
| 7,797,242 B2 * | 9/2010 | Gautier et al. | 705/52 |
| 8,161,411 B2 * | 4/2012 | Robbin et al. | 715/854 |
| 8,291,320 B2 * | 10/2012 | Robbin et al. | 715/716 |
| 8,489,453 B2 * | 7/2013 | Burkholder | 705/14.38 |
| 2002/0026335 A1 * | 2/2002 | Honda | 705/4 |
| 2003/0182139 A1 * | 9/2003 | Harris et al. | 705/1 |
| 2005/0262147 A1 * | 11/2005 | Lee | 707/104.1 |
| 2006/0123025 A1 * | 6/2006 | DeMello et al. | 707/100 |
| 2007/0220266 A1 * | 9/2007 | Cooper et al. | 713/176 |
| 2008/0034039 A1 | 2/2008 | Cisler et al. | |
| 2008/0147821 A1 * | 6/2008 | Dietrich et al. | 709/216 |

* cited by examiner

*Primary Examiner* — Alicia Baturay
(74) *Attorney, Agent, or Firm* — Orrick, Herrington & Sutcliffe LLP

(57) ABSTRACT

Methods, apparatuses, and systems for monitoring a browser's download activity to detect a download event associated with a digital content file, to determine an insurance policy related to the digital content file, and to provide a user with an option to insure the digital content file as described herein. Other embodiments may be described and claimed.

18 Claims, 4 Drawing Sheets

DIGITAL CONTENT DOWNLOAD INSURANCE

RELATED APPLICATIONS

The present application claims priority to U.S. Provisional Patent Application No. 60/956,530, filed Aug. 17, 2007, entitled "CONTENT DOWNLOAD INSURANCE." The specification of said application is hereby incorporated by reference in its entirety for all purposes, except for those sections, if any, that are inconsistent with this specification.

FIELD

Embodiments of the disclosure relate generally to online storage systems and, more specifically, to digital content download insurance.

BACKGROUND

There currently exists a variety of data back up, storage, and recovery schemes. One such scheme involves a user backing up files by saving selected files to an external hard drive. The external hard drive can either be located at the user's premises or be located remotely from the user. In another scheme, a content provider may offer a content consumer with an option to back up the provided content. This service, provided by the content provider, is usually associated with a cost in addition to the cost of the content.

Each of these schemes is associated with various challenges. For example, reliance on an external hard drive requires that the user be diligent in routinely performing the back up. Even if the back up routine could be automated, e.g., by saving the content of the user's hard drive to an external hard drive on a weekly basis, significant storage resources must be made available and much of what will get backed up is of little to no value to the user. Furthermore, reliance on the content provider to offer the back up service to the consumer restricts protection to content provided by that particular provider.

BRIEF DESCRIPTION OF THE DRAWINGS

Embodiments of the disclosure will be described referencing the accompanying drawings, in which like references denote similar elements.

DETAILED DESCRIPTION

Illustrative embodiments include but are not limited to processes, apparatuses, and systems that provide digital content download insurance.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

Figure 1:
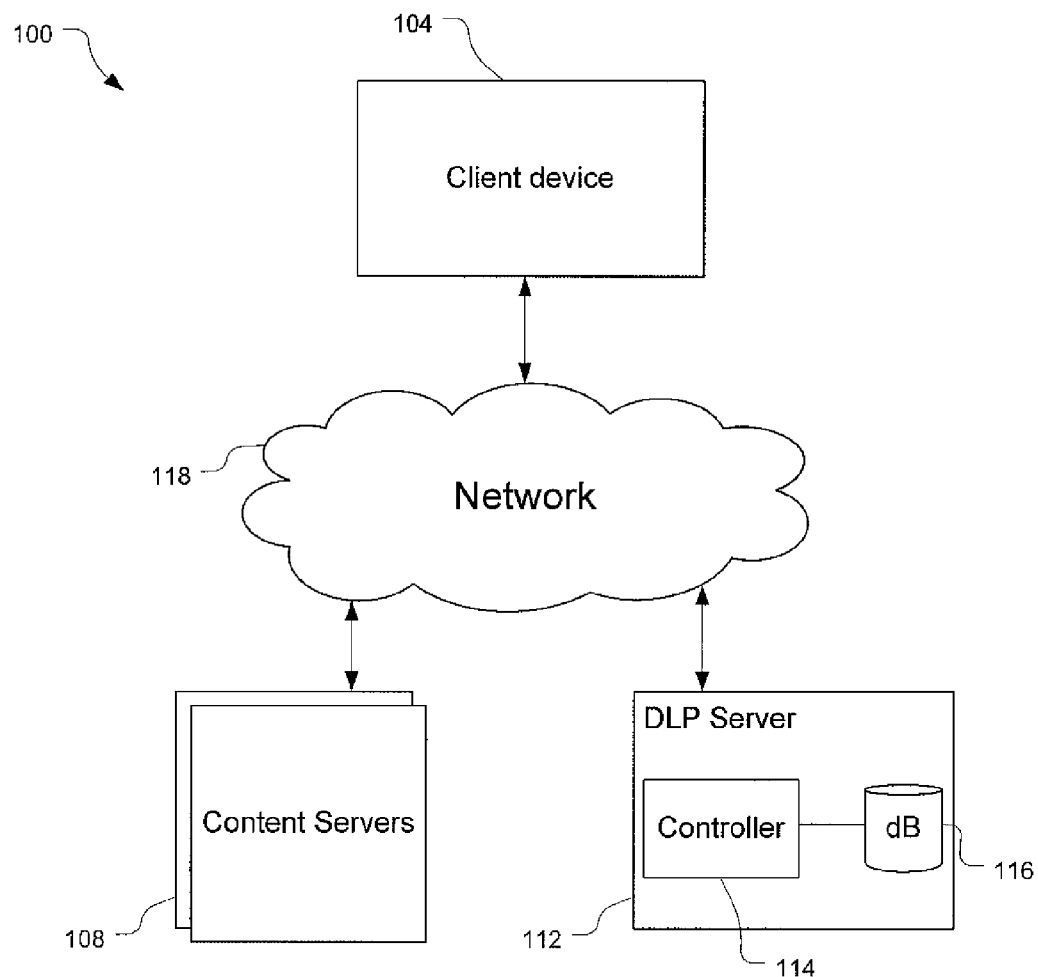
FIG. 1 illustrates a network environment in accordance with various embodiments.

FIG. 1 illustrates a network environment 100 according to various embodiments of this disclosure. In the network environment 100 a client device 104 is communicatively coupled to one or more content servers 108 and a download protection (DLP) server 112, having a controller 114 and a database 116, through a network 118, e.g., a wide area network (WAN), a local area network (LAN), a file network, a personal area network (PAN), etc.

A user may use the client device 104 to access digital content, e.g., digital content files, through the content servers 108. In this capacity, the client device 104 may be referred to as a content consumer and the content servers 108 may be referred to as content sources. It will be understood that while the digital content files may be sourced to the client device 104 from the content servers 108, they may be provided to the content server 108 from other sources. That is, the content servers 108 may or may not be the ultimate source of the digital content files.

In many embodiments, the digital content files may be digital media content files having any of a variety of media types including, but not limited to, music, movies, games, photos, etc. In some embodiments, the digital content files may include non-media content, e.g., program files, etc.

In some embodiments, the client device 104 may be configured with a download protection agent in order to insure the downloaded digital content files in the event of a loss, e.g., through theft, fire, computer crash, file corruption, etc. As will be explained in further detail below, when a download event that is associated with a digital content file is detected on the client device 104, the client device 104 and the DLP server 112 may engage one another in an insuring procedure. Providing the download agent on the client device 104 may allow for the insuring of a wide variety of digital content files from a wide variety of content sources. The DLP server 112 does not need to be, and in most cases is not, associated with the content servers 108 that provide the digital content files.

Figure 2:
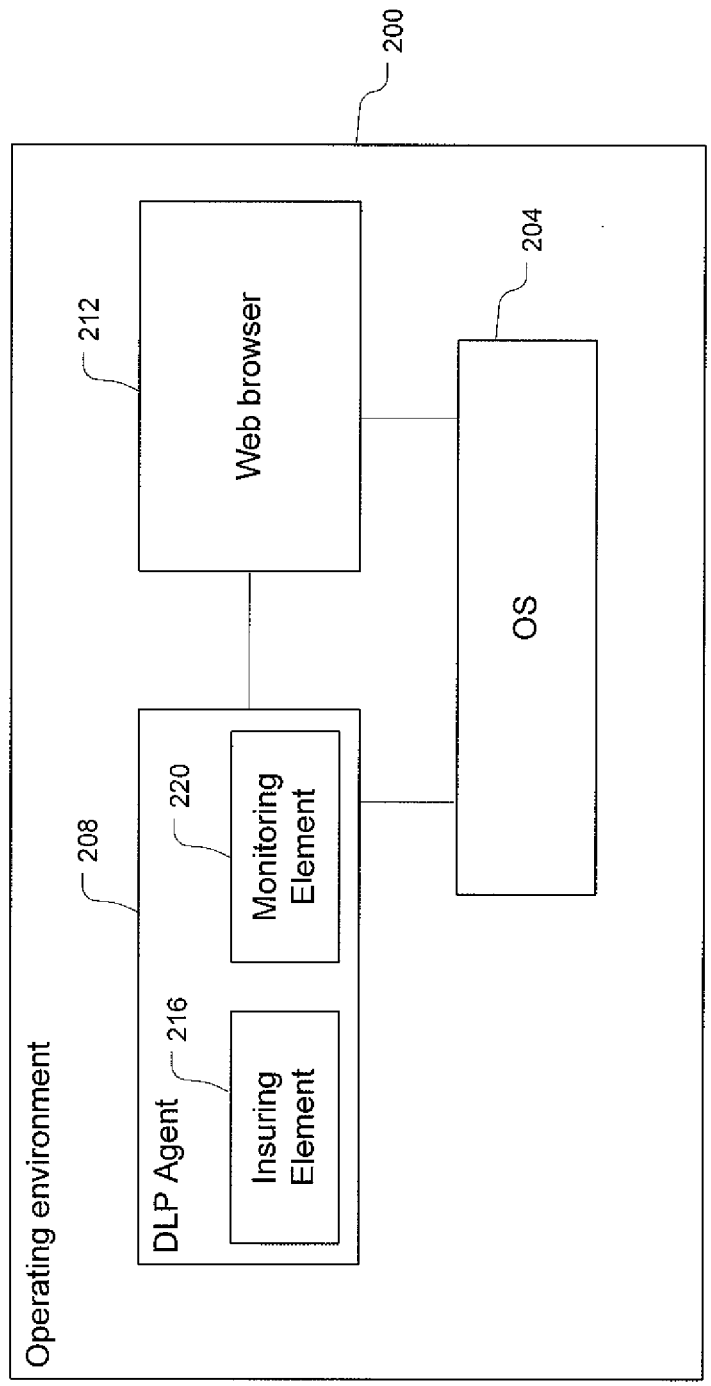
FIG. 2 illustrates an operating environment that may exist on a client device in accordance with various embodiments.

FIG. 2 illustrates an operating environment 200 that may exist on the client device 104 in accordance with some embodiments. The operating environment 200 may have an operating system (OS) 204 that manages and coordinates activities of the various components of the client device 104. In particular, the OS 204 may manage and coordinate interaction of the various applications of the client device 104, e.g., a DLP agent 208 and a web browser 212, with the hardware components of the client device 104.

The web browser 212 may be an application that allows a user of the client device 104 to communicate, e.g., access and/or transmit information, with various nodes over the network 118. In many embodiments, the web browser 212 may interact with a webpage at a website that may be hosted on a server, e.g., the content servers 108 and/or the DLP server 112. Interactions between the web browser 212 and the webpages of the content servers 108 may result in digital content files being downloaded from the content servers 108 to the client device 104. The DLP agent 208, which may include an insuring element 216 and a monitoring element 220, may detect download events associated with digital content files and take appropriate measures to insure, or at least present the user with the option of insuring, selected digital content files.

The DLP agent 208 may be a plug-in to the web browser 212 that provides monitoring and control of the web browser 212 to provide the insuring operations discussed herein. The DLP agent 208 may be initially downloaded onto the client device 104 from the DLP server 112.

Figure 3:
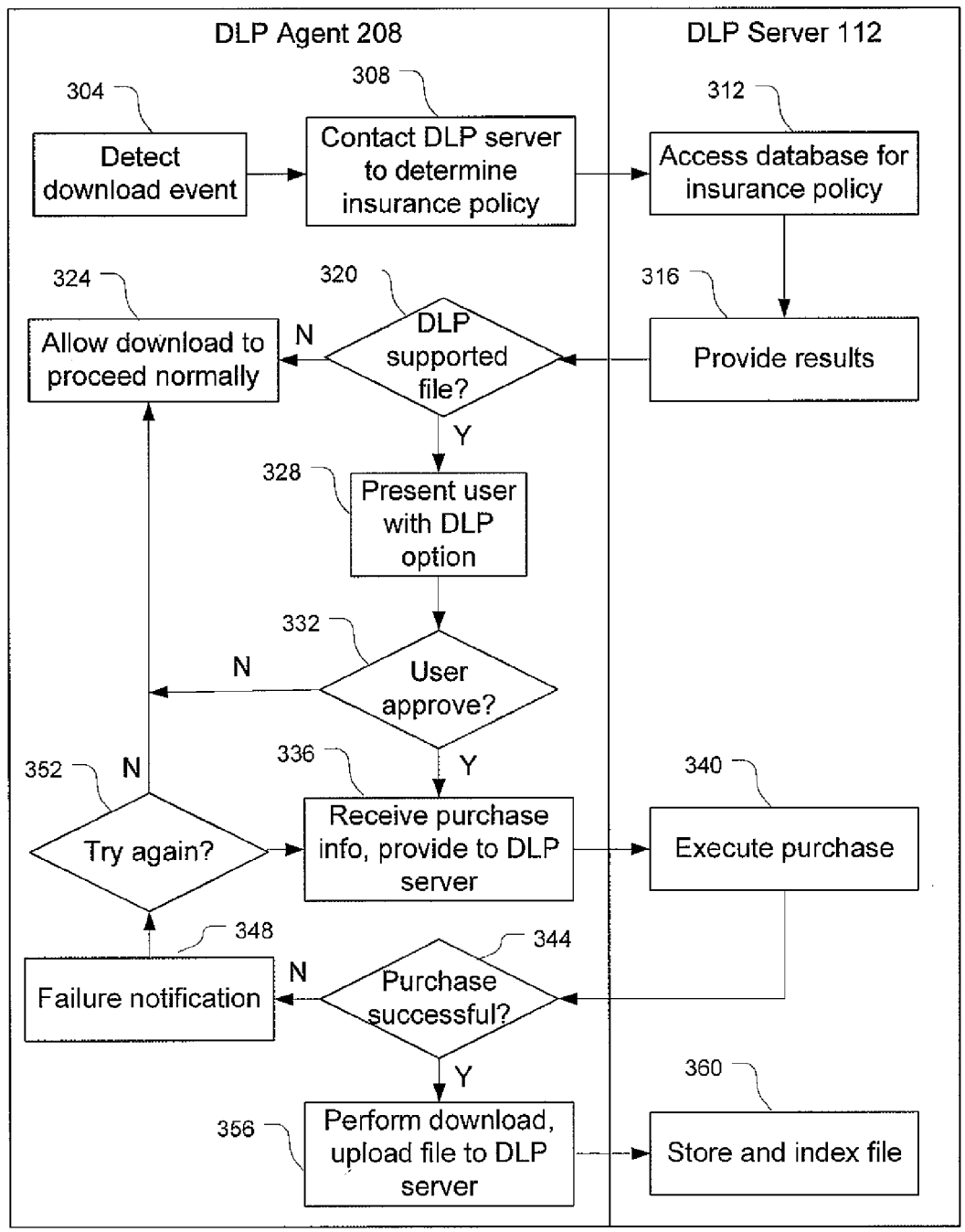
FIG. 3 is a flowchart depicting an insuring procedure in accordance with various embodiments.

FIG. 3 is a flowchart illustrating an insuring procedure 300 in accordance with various embodiments of the present disclosure. At block 304, the DLP agent 208, and the monitoring element 220, in particular, may detect a download event occurring with respect to the web browser 212. The monitoring element 220 may detect a download event by monitoring program port requests, which may be done through known applications and user configurable settings. Thus, a download event may be the detection of the web browser 212 making a request to download a digital content file. In other embodiments, other download events may be utilized.

After the monitoring element 220 detects a download event associated with a digital content file, the insuring element 216 may acquire metadata of the digital content file and transmit the metadata to the DLP server 112 at block 308 to determine whether the DLP server 112 has an insurance policy related to the digital content file. The metadata may include, e.g., type of file, name of file, size of file, whether it is a legitimate media commerce source, etc.

While this embodiment discusses the DLP agent 208 initiating contact with the DLP server 112, in other embodiments, the DLP server 112 may initiate contact with the DLP agent 208. This may occur, e.g., on a periodic basis.

In some embodiments, the monitoring element 220 may be a relatively lightweight thread that is configured to operate contemporaneously with the web browser 212, while the insuring element 216, which may include the more robust and complex processes, may be configured to operate as needed, e.g., once a download event has been detected. The contemporaneous operation of the web browser 212 and the monitoring element 220 may prevent undetected downloads from occurring. Furthermore, selective activation of the insuring element 216 may conserve system resources.

As used herein, contemporaneous operation means beginning and ending at approximately the same time. Sequentially scheduled startup or shutdown of the monitoring element 220 and web browser 212 will not negate contemporaneous operation.

After the DLP server 112 receives the metadata from the insuring element 216, the controller 114 may access the database 116 to determine whether there is an insurance policy related to the digital content file at block 312. The insurance policy may include information as to the types of files that are insurable, the costs associated with insuring various files, and/or any other policies that may be related to the insuring operation. At block 316, the DLP server 112 may provide the results, e.g., the insurance policy, to the DLP agent 208.

At block 320, the DLP agent 208 may determine whether the digital content file is a DLP supported file based at least in part on the results provided by the DLP server 112. If the file is not a DLP supported file, the download may be allowed to proceed normally at block 324. If the file is a DLP supported file, the insuring element 216 may present the user with a DLP option, which the user may approve or disapprove at block 332. The DLP option presented to the user may include costs associated with the insuring operation.

The insuring procedure 300 shown in FIG. 3 provides the user with an insuring option on each supported file. However, in other embodiments the user may provide the DLP agent 208 with default instructions to insure all supported files and/or all supported files of particular file types. For example, a user may indicate a preference to insure all supported MP3 downloads. In this embodiment, the DLP agent 208 and DLP server 112 may determine whether a particular download is a supported MP3 file and, if so, automatically perform the insuring services without the operations of block 328 and 332.

Referring again to the insuring procedure 300, if the user disapproves at block 332, the insuring element 216 may allow the download to proceed normally at block 324. If the user approves at block 332, the insuring element 216 may receive purchase information, e.g., personal and billing information, etc., from the user. The purchase information may be received from the user by directly soliciting the user for the information or by accessing stored information that was previously acquired from the user. The purchase information may be transmitted to the DLP server 112, which may execute the purchase at block 340.

The insuring element 216 may receive a response from the DLP server 112 and determine whether the purchase was successful at block 344. If not, the DLP agent 208 may issue a failure notification at block 348 and determine whether to attempt to execute the purchase again at block 352, which may be based on the number of failed attempts. If the insuring element 216 determines not to try to execute the purchase again, the insuring element 216 may allow the download to proceed normally at block 324, else, the process may loop back to block 336.

If the purchase is determined to be successful at block 344, the insuring element 216 may download the digital content file from the content servers 108, and may subsequently upload the digital content file to the DLP server 112 at block 356. In some embodiments, the insuring element 216 may collect a number of digital content files that are to be uploaded and perform a batch upload. A batch upload may be done when the client device 104 is less active to reduce interruption of service to the user.

In some embodiments, instead of downloading the file to the client device 104 and then uploading the file to the DLP server 112, the insuring element 216 may redirect the content server sourcing the digital content file so that the file is first transferred to the DLP server 112. A copy of the file may then be downloaded to the client device 104 from the DLP server 112. In this embodiment, the DLP server 112 may function as a proxy server.

The DLP server 112 may store and index the file, at block 360, to allow for a subsequent restoration of the insured files.

In some embodiments, restoration of insured files (hereinafter "restoration") may occur as follows. A user may browse to a restoration page on website associated with the DLP server 112. The user may then request a restoration of a designated file and complete an additional payment (if necessary). The user may then access the insured files. In some embodiments, access to the insured files may take place over a network, e.g., by downloading the insured file directly from the DLP server 112. In some embodiments, access to the insured files may take place through an archiving device being delivered to the user for local reinstallation on the client machine. The archiving device may be, but is not limited to, a compact disc, digital versatile disc, a flash drive, etc. In some embodiments, the archiving device may then be returned through a pre-paid mail packaging.

In some embodiments, a restoration request may be validated through user credentials, which may allow the user to restore insured files without having to use the same client device 104 or DLP agent 208 used in the original insuring procedure.

While the above embodiments discuss automatic detection of a download event initiating the insuring procedure, other embodiments may provide for manual or periodic insuring operations. For example, in a manual insuring operation a user may click on a program icon to indicate that a download is occurring, has occurred, or is about to occur. At that time, the DLP agent 208 may continue from block 308 to determine whether insuring of the downloaded file is supported and desired.

In an embodiment utilizing a periodic insuring operation, the DLP agent 208 may periodically scan the client device 104 to determine whether any downloaded digital content files are eligible and/or desired for insuring. If the user decides to insure these resident digital content files, the uploading may take place during user downtime.

In some embodiments, the detection of the download events performed by the monitoring element 220 may be a selective detection. That is, not every download event will trigger the insuring procedure 300. In some embodiments, only download events associated with certain types of files may trigger the insuring procedure. These types of files may be designated by the user or may be adaptively learned by the DLP agent 208 through the recognition of user patterns. In the latter context, the detection of a download event associated with a digital content file of a given type may, therefore, be based at least in part on a previous user selection of another digital content file of the same type.

Figure 4:
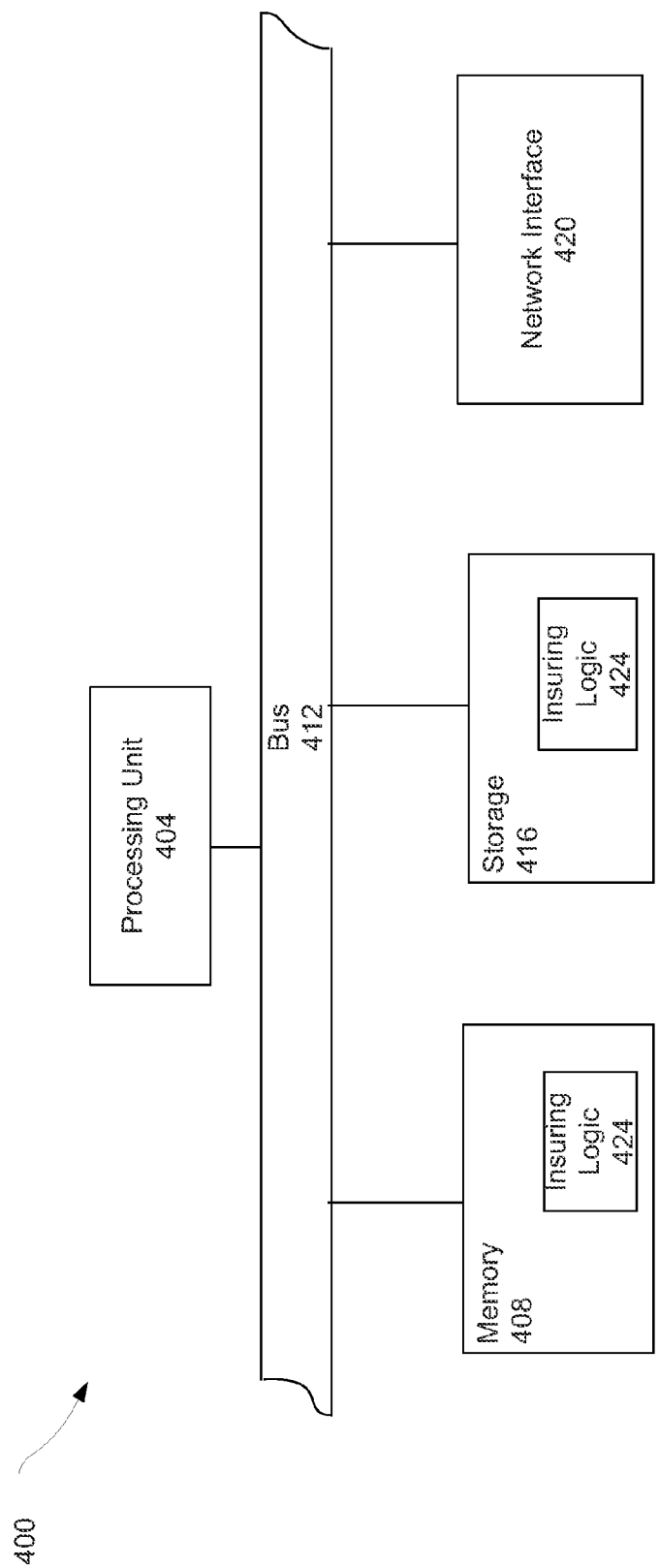
FIG. 4 illustrates a computing device capable of operating as a client device or a server in accordance with various embodiments.

FIG. 4 illustrates a computing device 400 capable of operating as the client device 104 or the DLP server 112 in accordance with various embodiments. As illustrated, for the embodiments, computing device 400 includes a processing unit 404, memory 408, and bus 412, coupled to each other as shown. Additionally, computing device 400 includes storage 416, and a network interface 420 coupled to each other, and the earlier described elements as shown.

Memory 408 and storage 416 may include in particular, temporal and persistent copies of insuring logic 424, respectively. The insuring logic 424 may include instructions that when executed by the processing unit 404 result in the computing device 400 performing monitoring and/or insuring operations described in conjunction with the DLP agent 208 and/or DLP server 112.

In various embodiments, the processing unit 404 may include one or more single-core processors, multiple-core processors, controllers, application-specific integrated circuits (ASICs), etc.

In various embodiments, the memory 408 may include RAM, dynamic RAM (DRAM), static RAM (SRAM), synchronous DRAM (SDRAM), dual-data rate RAM (DDRRAM), etc.

In various embodiments, storage 416 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 416 may be a storage resource physically part of the wireless network device on which the computing device 400 is installed or it may be accessible by, but not necessarily a part of, the wireless network device. For example, the storage 416 may be accessed over a network via the network interface 420.

In various embodiments, the network interface may include a network interface card to couple the computing device 400 to a communication network, e.g., network 118.

In various embodiments, computing device 400 may have more or less components, and/or different architectures. In various embodiments, computing device 400 may be a mobile phone, a mobile communication device, a laptop computing device, a desktop computing device, a server, etc.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus comprising:
    a browser configured to be communicatively coupled to a network; and
    a download agent coupled to the browser and including
        a monitoring element configured to operate contemporaneously with the browser
            to monitor activity of the browser to detect a download event associated with downloading a digital content file from a content server, wherein the download event is a request sent by the browser to the content server; and
        an insuring element configured:
            to send a request, to a download protection (DLP) server, for an insurance policy related to the digital content file, wherein the request for the insurance policy is sent in response to a detection of the download event by the monitoring element and prior to downloading of the digital content file to the apparatus;
            to provide a user of the apparatus with an option to insure the digital content file based at least in part on receipt of the insurance policy;
            to receive, as user input, a selection indicating a desire to insure the digital content file; and
            to upload, subsequent to a downloading of the digital content file to the apparatus, the digital content file to the download protection server based on receipt of the selection.

2. The apparatus of claim 1, wherein the
    monitoring element is further configured to activate the insuring element based at least in part on the detected download event.

3. The apparatus of claim 1, wherein the digital content file is a first digital content file of a file type, the selection indicates a desire to insure all digital content files of the file type, and the download agent is further configured
    to detect another download event associated with a second digital content file, which is of the file type; and to upload the second digital content file based at least in part on said received selection.

4. The apparatus of claim 1, wherein the download agent is further configured
to transmit at least two digital content files, including the digital content file, to the server in a batch upload.

5. The apparatus of claim 1, wherein the download agent is configured to determine the insurance policy by being configured:
to transmit metadata describing the digital content file to the DLP server; and
to receive the insurance policy in response to transmitting of the metadata.

6. The apparatus of claim 1, wherein the monitoring element is further configured to monitor activity of the browser to detect download events associated with downloading digital content files from a plurality of content servers.

7. The apparatus of claim 1, wherein the monitoring element is configured to monitor a program port request to detect the download event.

8. The apparatus of claim 1, wherein the browser is configured to download the download agent from the DLP server.

9. The apparatus of claim 1, wherein the insuring element is configured to include metadata describing the digital content file in the request for the insurance policy.

10. The apparatus of claim 1, wherein the monitoring element is configured to selectively detect download events related to a file type based at least in part on previous receipt of selection indicating desire to insure one or more digital content files of the file type.

11. An apparatus comprising:
a database having digital content insurance policies; and
a controller coupled to the database and configured
to receive, from a client device, metadata describing a digital content file,
to access the database to determine an insurance policy related to the digital content file based on the metadata,
to provide the insurance policy to the client device,
to receive, subsequent to receipt of the metadata and provision of the insurance policy, the digital content file, and
to store and index the digital content file,
wherein the client device is configured
to send via a browser, a request comprising the metadata describing the digital content file;
to monitor activity of the browser to detect a download event associated with downloading of the digital content file, wherein the download event is the sending of the request; and
to send a request, by an insuring element to a download protection (DLP) server for an insurance policy related to the digital content file, wherein the request for the insurance policy is sent based on a detection of the download event and prior to a downloading of the digital content file to an apparatus hosting the browser.

12. The apparatus of claim 11, wherein the controller is further configured to receive the digital content file from the client device.

13. The apparatus of claim 11, wherein the controller is further configured
to receive the digital content file from a content server, and
to provide the digital content file to the client device.

14. The apparatus of claim 11, wherein the controller is further configured
to receive, from a requestor, a restoration request associated with the digital content file; and
to provide the digital content file to the requestor.

15. The apparatus of claim 11, wherein the metadata includes a type of file, name of file, or size of file.

16. A method comprising:
sending a request, by a browser to a content server, for a digital content file;
monitoring activity of the browser to detect a download event associated with the downloading of the digital content file, wherein the download event is the sending of the request;
sending a request, by an insuring element to a download protection (DLP) server for an insurance policy related to the digital content file, wherein the request for the insurance policy is sent based on a detection of the download event and prior to a downloading of the digital content file to an apparatus hosting the browser;
providing a user with an option to insure the digital content file based at least in part on the insurance policy;
receiving, as user input, a selection indicating a desire to insure the digital content file; and
uploading, subsequent to said downloading, the digital content file to the download protection server based on said receiving of the selection.

17. The method of claim 16, wherein the digital content file is a first digital content file of a file type, the selection indicates a desire to ensure all digital content files of the file type, and the method further comprises:
detecting another download event associated with a second digital content file, which is of the file type; and
uploading the second digital content file based at least in part on said receiving of the selection.

18. The method of claim 16, further comprising:
transmitting at least two digital content files, including the digital content file, to the server in a batch upload.

* * * * *